United States Patent
Osindero et al.

(10) Patent No.: US 10,558,720 B2
(45) Date of Patent: Feb. 11, 2020

(54) METHOD AND SYSTEM FOR SELECTING SUPPLEMENTAL CONTENT USING VISUAL APPEARANCE

(71) Applicant: OATH INC., New York, NY (US)

(72) Inventors: Simon Osindero, San Francisco, CA (US); Ioannis Kalantidis, San Francisco, CA (US); David Shamma, San Francisco, CA (US); Lyndon Kennedy, San Francisco, CA (US); Ayman Farahat, San Francisco, CA (US); Gerry Pesavento, Orinda, CA (US); Ricardo Baeza-Yates, Palo Alto, CA (US)

(73) Assignee: OATH INC., New York, NY (US)

( * ) Notice: Subject to any disclaimer, the term of this patent is extended or adjusted under 35 U.S.C. 154(b) by 533 days.

(21) Appl. No.: 15/097,658

(22) Filed: Apr. 13, 2016

(65) Prior Publication Data
US 2017/0300576 A1 Oct. 19, 2017

(51) Int. Cl.
*G06F 16/00* (2019.01)
*G06F 16/9535* (2019.01)

(52) U.S. Cl.
CPC .................. *G06F 16/9535* (2019.01)

(58) Field of Classification Search
CPC .................. G06F 17/30867; G06F 17/30554
See application file for complete search history.

(56) References Cited

U.S. PATENT DOCUMENTS

| | | | | |
|---|---|---|---|---|
| 2011/0208581 | A1* | 8/2011 | Roebuck | G06Q 30/00 705/14.49 |
| 2012/0095837 | A1* | 4/2012 | Bharat | G06F 17/30867 705/14.54 |
| 2015/0324868 | A1* | 11/2015 | Kaftan | G06Q 30/0241 707/750 |

OTHER PUBLICATIONS

J. Abbruzzese. Vanity Fair is latest to roll out native advertising. URL, Dec. 2013. Retrieved Oct 2, 2015 from http://mashable.com/2013/12/13/ vanity-fair-native-advertising/. http://mashable.com/2013/12/13/vanity-fair-native-advertising/#InNdNBXi5Eq8.
A. Babenko et al.; "Neural codes for image retrieval," in ECCV, 16 pages (2014).
R. A. Baeza-Yates and B. A. Ribeiro-Neto. Modern Information Retrieval—the concepts and technology behind search, Second edition. Pearson Education Ltd., Harlow, England, 2011. http://www.amazon.com/Modern-Information-Retrieval-Concepts-Technology/dp/0321416910/ref=asap_bc?ie=UTF8.
(Continued)

*Primary Examiner* — Grace Park
(74) *Attorney, Agent, or Firm* — James J. DeCarlo; Greenberg Traurig, LLP

(57) ABSTRACT

Disclosure includes system, method and architecture for selecting supplemental digital content using visual appearance. Digital content that is visually similar, or dissimilar, to digital content requested by a user can he identified and provided for presentation with the requested content. The additional digital content is visually congruent, or visually incongruent, with content requested by a user, such that the additional content is similar, or dissimilar, to the requested content from a visual standpoint. In a presentation of the
(Continued)

requested content, the presentation position of each additional content item relative to the presentation position of each requested content can be identified using visual congruence, or visual incongruence.

26 Claims, 11 Drawing Sheets

(56) References Cited

OTHER PUBLICATIONS

Y. Cheng, "Mean shift, mode seeking, and clustering," IEE Transactions on Pattern Analysis and Machine Intelligence, vol. 17, No. 8, pp. 790-799 (1995).
S. G. Cole et al.; "The brand value of rich media and video ads," retrieved Feb. 21, 2012, 23 pages (2009).
M. Datar et al., "Locality-sensitive hashing scheme based on p-stable distributions," In Symposium on Computational Geometry, 10 pages (2004).
K. Dave et al., "Computational Advertising: Techniques for Targeting Relevant Ads. Foundations and Trends," in Information Retrieval, vol. 8, No. 4-5, 49 pages (2014).
M. de Sa et al., "Mobile advertising: evaluating the e?ects of animation, user and content relevance," In Proceedings of the SIGCHI Conference on Human Factors in Computing Systems, pp. 2487-2496. ACM (2013).
J. Delhumeau et al., "Revisiting the VLAD image representation," In ACM Multimedia, 5 pages (2013).
T. Ge et al. "Optimized product quantization," Technical Report 4, 8 pages (2014).
A. S. Gerber and D. P. Green. Field experiments: Design, analysis, and interpretation. WW Norton, 2012. http://www.amazon.com/Field-Experiments-Design-Analysis-Interpretation/dp/0393979954.
A. Goldfarb, "What is different about online advertising?" Review of Industrial Organization, 44(2):115-129 (2014).
A. Goldfarb and C. Tucker. Online display advertising: Targeting and obtrusiveness. Marketing Science, 30(3):389-404, 42 pages (2011).
A. Goldfarb et al. "Search engine advertising: Channel substitution when pricing ads to context," Management Science, 57(3):458-470 (2011).
D. G. Goldstein et al., "The cost of annoying ads," In Proceedings of the 22nd international conference on World Wide Web, pp. 459-470. International World Wide Web Conferences Steering Committee (2013).
P.H. Gosselin et al., "Revisiting the Fisher vector for fine-grained classification," Pattern Recognition Letters, 49:92-98 (2014).
M. Hollander, D. A. Wolfe, and E. Chicken. Nonparametric statistical methods. John Wiley & Sons, 2013. hittp://www.amazon.com/Nonparametric-Statistical-Methods-Myles-Hollander/dp/0470387378.
P. J. Huber et al., "Robust estimation of a location parameter," The Annals of Mathematical Statistics, 35(1):73-101 (1964).
H. J'egou et al., "Product quantization for nearest neighbor search," PAMI, 33(1), 14 pages (2011).
H. J'egou et al., Aggregating local descriptors into a compact image representation, CVPR, 10 pages (2010).
Z. Jin et al., "Complementary projection hashing," ICCV, pp. 257-264 (2013).
Y. Kalantidis et al., "Locally optimized product quantization for approximate nearest neighbor search," CVPR, 8 pages (2014).
A. Krizhevsky et al., "ImageNet classification with deep convolutional neural networks," NIPS, 9 pages (2012).
D. Lowe, "Distinctive image features from scale-invariant keypoints," Journal of Computer Vision, 60(2):91-110 (2004).
M. Norouzi et al., "Fast search in Hamming space with multi-index hashing," CVPR, 8 pages (2012).
L. Paulev'e et al., "Locality sensitive hashing: a comparison of hash function types and querying mechanisms," Pattern Recognition Letters, 31(11):1348-1358 (2010).
F. Perronnin et al., "Large-scale image retrieval with compressed Fisher vectors," CVPR, 8 pages (2010).
O. Russakovsky et al., "ImageNet large scale visual recognition challenge," arXiv preprint arXiv:1409.0575, 43 pages (2014).
J. Sivic et al., "Video Google: A text retrieval approach to object matching in videos," ICCV, pp. 1470-1477 (2003).
C. Szegedy et al., "Going deeper with convolutions," arXiv preprint arXiv:1409.4842, 9 pages (2014).
T. S. Teixeira et al., "Moment-to-moment optimal branding in tv commercials: Preventing avoidance by pulsing," Marketing Science, 29(5):783-804 (2010).
B. Thomee et al., "The new data and new challenges in multimedia research," arXiv preprint arXiv:1503.01817, 8 pages (2015).
G. Tolias et al., "To aggregate or not to aggregate: Selective match kernels for image search," ICCV, 9 pages (2013).
M. Toomim et al., "Utility of human-computer interactions: Toward a science of preference measurement," Proceedings of the SIGCHI Conference on Human Factors in Computing Systems, pp. 2275-2284. ACM (2011).
L. Van Der Maaten, "Accelerating t-SNE using tree-based algorithms," JMLR, 15(1):3221-3245 (2014).
L. Van der Maaten et al., "Visualizing data using t-SNE," Journal of Machine Learning Research, 9(2579-2605):85 (2008).
A. Vedaldi et al., "Quick shift and kernel methods for mode seeking," ECCV, 14 pages (2008).

* cited by examiner

METHOD AND SYSTEM FOR SELECTING SUPPLEMENTAL CONTENT USING VISUAL APPEARANCE

FIELD OF THE DISCLOSURE

The present disclosure relates to presenting digital visual content, and more particularly to identifying visually-congruent, or visually-incongruent, digital content items for presentation together, such as in the same web page.

BACKGROUND

There is a vast amount of digital content available online for computer users. In order to access digital content online, a computer user might, for example, enter a query with one or more search terms to search for and retrieve digital content relevant to the search term(s). In a case that the user uses a web browser to input the query and request a search, a search engine may be used to identify the relevant digital content, which can be displayed in a web page by the web browser.

SUMMARY

It would be beneficial to be able to identify digital content in addition to the content requested by the user. The additional content allows the user to experience more digital content, for example. The additional content may be visually congruent, or visually incongruent, with the requested content, such that the additional content is visually similar, or dissimilar, to the requested content from a visual standpoint. By way of a non-limiting example, a visually congruent content item can match a visual style of one or more images included in a set of image search results requested by the user. As an alternative to or in addition to visual congruent content, a number of content items may be identified that are visually incongruent, or are the least visually congruent, to the requested content. By making search results more visually compelling, it encourages users to stay on a site or page longer, or discover new content as a result of such site or page, thus increasing user engagement and loyalty.

Embodiments of the present disclosure identify a number of additional content items. At least one such embodiment further identifies a presentation position of each additional content item relative to a presentation position of each of a number of content items requested by the user. Embodiments of the present disclosure can be used in real-time in connection with an image search via the web, such as and without limitation a web-wide search or a website search, a personal photo search, etc. By way of some non-limiting examples, embodiments of the present disclosure may be used to search for images at a digital content hosting website such as Flickr®, a microblogging and social networking website such as Tumblr®, etc.

In accordance with one or more embodiments, a method is provided, the method comprising receiving, by a server computing device from a client computing device, a request for a set of primary content items; selecting, by the server computing device, a number of primary content items using selection criteria associated with the request; obtaining, by the server computing device and for each primary content item of the number, a feature vector representing a visual appearance of the primary content item; obtaining, by the server computing device and for each supplemental content item of a number of supplemental content items, the feature vector representing the visual appearance of the supplemental content item; selecting, by the server computing device and using a number of the obtained feature vectors, a supplemental content item from the number of supplemental content items based on its visual appearance relative to at least one primary content item of the number of primary content items, the selecting comprising using a distance measure determined using the feature vector of the selected supplemental content item and the feature vector of each primary content item of the at least one primary content item, the distance measure indicating whether or not the selected supplemental content item is similar in visual appearance to the at least one primary content item; positioning, by the server computing device, the number of primary content items and the selected supplemental content item in a presentation response, the selected supplemental content item being positioned adjacent to the at least one primary content item in the presentation response; and transmitting, by the server computing device, the presentation response in response to the primary content item request.

In accordance with one or more embodiments a system is provided, which system comprises a server computing device comprising a processor and a storage medium for tangibly storing thereon program logic for execution by the processor, the stored program logic comprising: receiving logic executed by the processor for receiving, from a client computing device, a request for a set of primary content items; selecting logic executed by the processor for selecting a number of primary content items using selection criteria associated with the request; obtaining logic executed by the processor for obtaining, for each primary content item of the number, a feature vector representing a visual appearance of the primary content item; obtaining logic executed by the processor for obtaining, for each supplemental content item of a number of supplemental content items, the feature vector representing the visual appearance of the supplemental content item; selecting logic executed by the processor for selecting, using a number of the obtained feature vectors, a supplemental content item from the number of supplemental content items based on its visual appearance relative to at least one primary content item of the number of primary content items, the selecting comprising using a distance measure determined using the feature vector of the selected supplemental content item and the feature vector of each primary content item of the at least one primary content item, the distance measure indicating whether or not the selected supplemental content item is similar in visual appearance to the at least one primary content item; positioning logic executed by the processor for positioning the number of primary content items and the selected supplemental content item in a presentation response, the selected supplemental content item being positioned adjacent to the at least one primary content item in the presentation response; and transmitting logic executed by the processor for transmitting the presentation response in response to the primary content item request.

In accordance with yet another aspect of the disclosure, a computer readable non-transitory storage medium is provided, the computer readable non-transitory storage medium is tangibly encoded with computer-executable instructions, that when executed by a processor associated with a computing device, performs a method comprising: receiving, from a client computing device, a request for a set of primary content items; selecting a number of primary content items using selection criteria associated with the request; obtaining, for each primary content item of the number, a feature vector representing a visual appearance of the primary content item; obtaining, for each supplemental content item of a number of supplemental content items, the feature vector representing the visual appearance of the supplemental content item; selecting, using a number of the obtained feature vectors, a supplemental content item from the number of supplemental content items based on its visual appearance relative to at least one primary content item of the number of primary content items, the selecting comprising using a distance measure determined using the feature vector of the selected supplemental content item and the feature vector of each primary content item of the at least one primary content item, the distance measure indicating whether or not the selected supplemental content item is similar in visual appearance to the at least one primary content item; positioning the number of primary content items and the selected supplemental content item in a presentation response, the selected supplemental content item being positioned adjacent to the at least one primary content item in the presentation response; and transmitting the presentation response in response to the primary content item request.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium,

DRAWINGS

The above-mentioned features and objects of the present disclosure will become more apparent with reference to the following description taken in conjunction with the accompanying drawings wherein like reference numerals denote like elements and in which:

FIG. 1 provides an overview of components in an architecture in accordance with one or more embodiments of the present disclosure.

FIG. 2 provides an overview process flow in accordance with one or more embodiments of the present disclosure.

FIG. 3 provides a content item presentation process flow in accordance with one or more embodiments.

FIG. 4 shows an example of a positioning strategy for use in accordance with one or more embodiments of the present disclosure.

FIG. 5 provides an example of a two dimensional approach in accordance with one or more embodiments of the present disclosure.

Figure 7A:
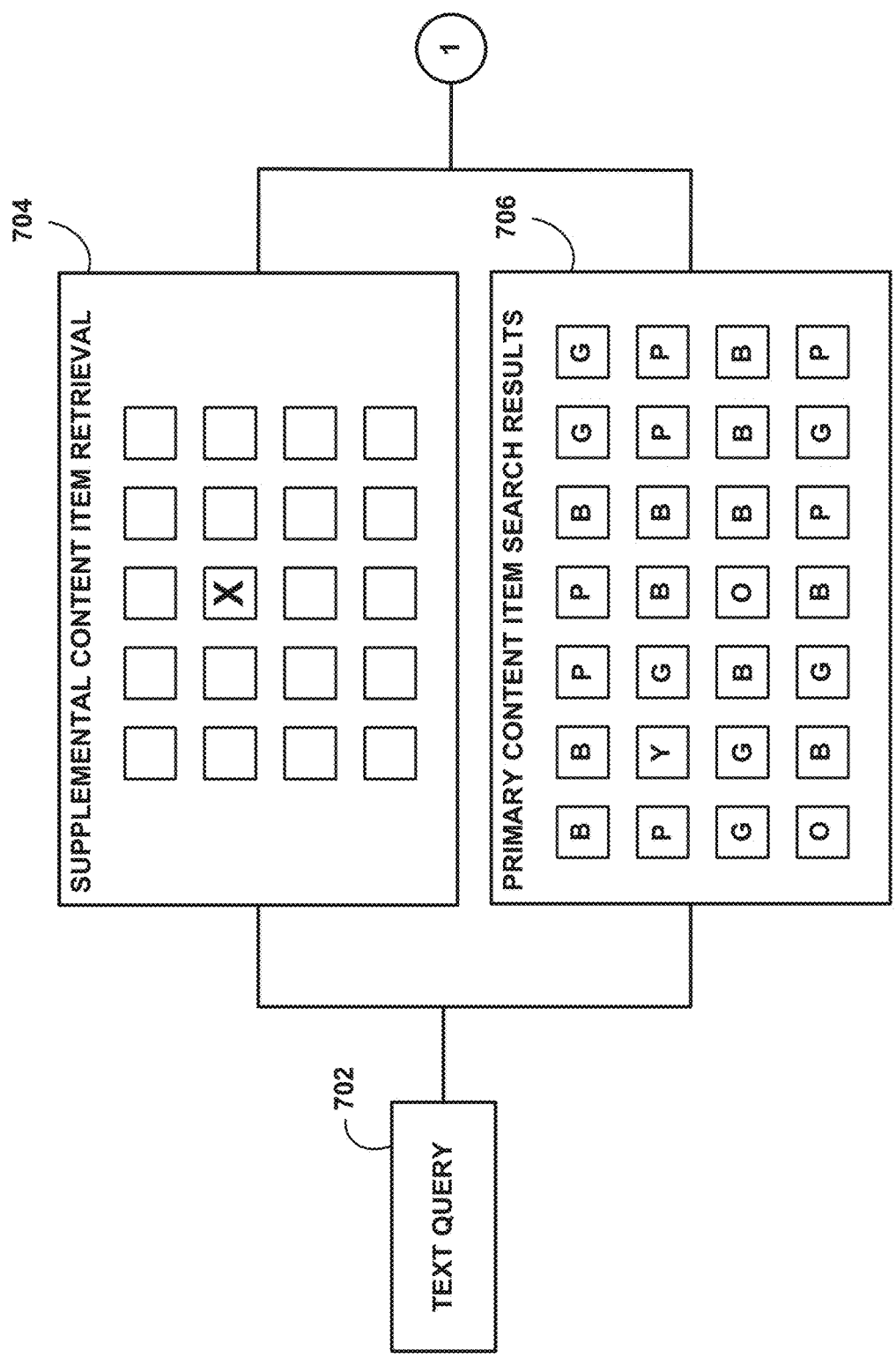
Figure 7B:
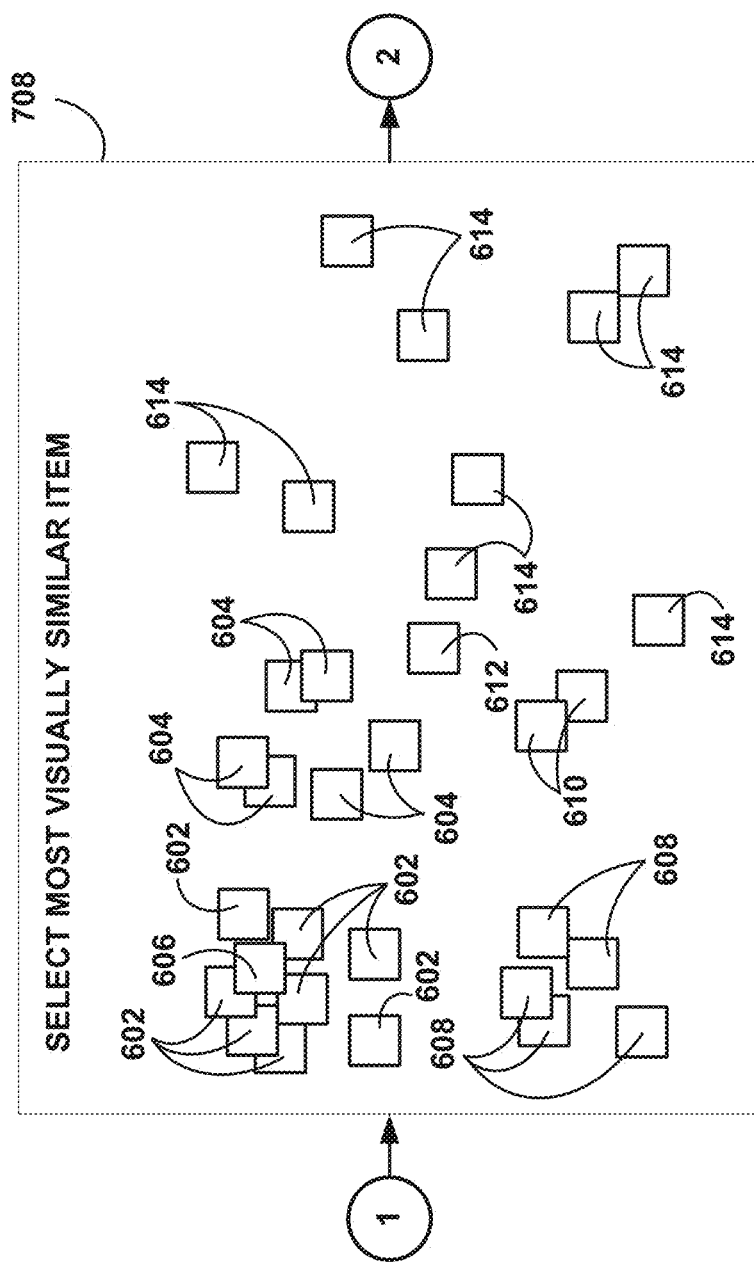
Figure 7C:
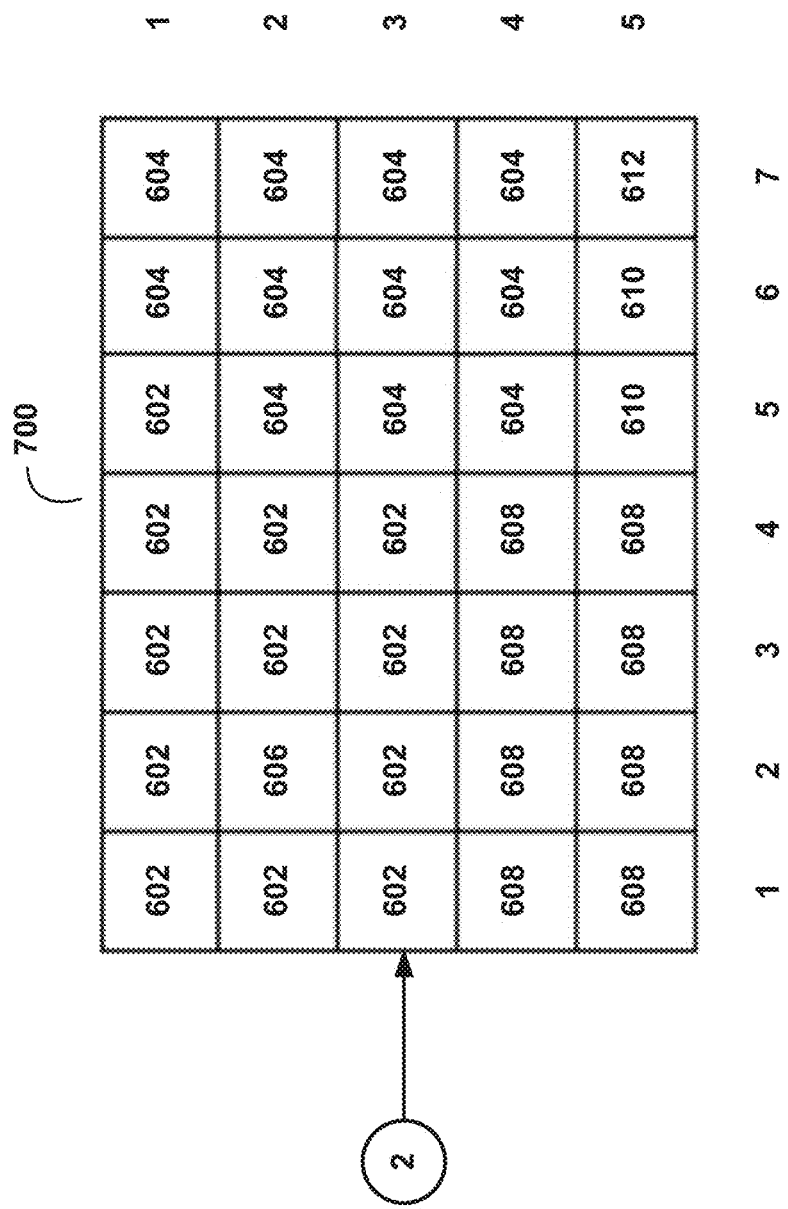

FIG. 7, which comprises FIGS. 7A, 7B and 7C, provides an example of a flow which uses projection and clustering for content item positioning in accordance with one or more embodiments of the present disclosure.

Figure 8:
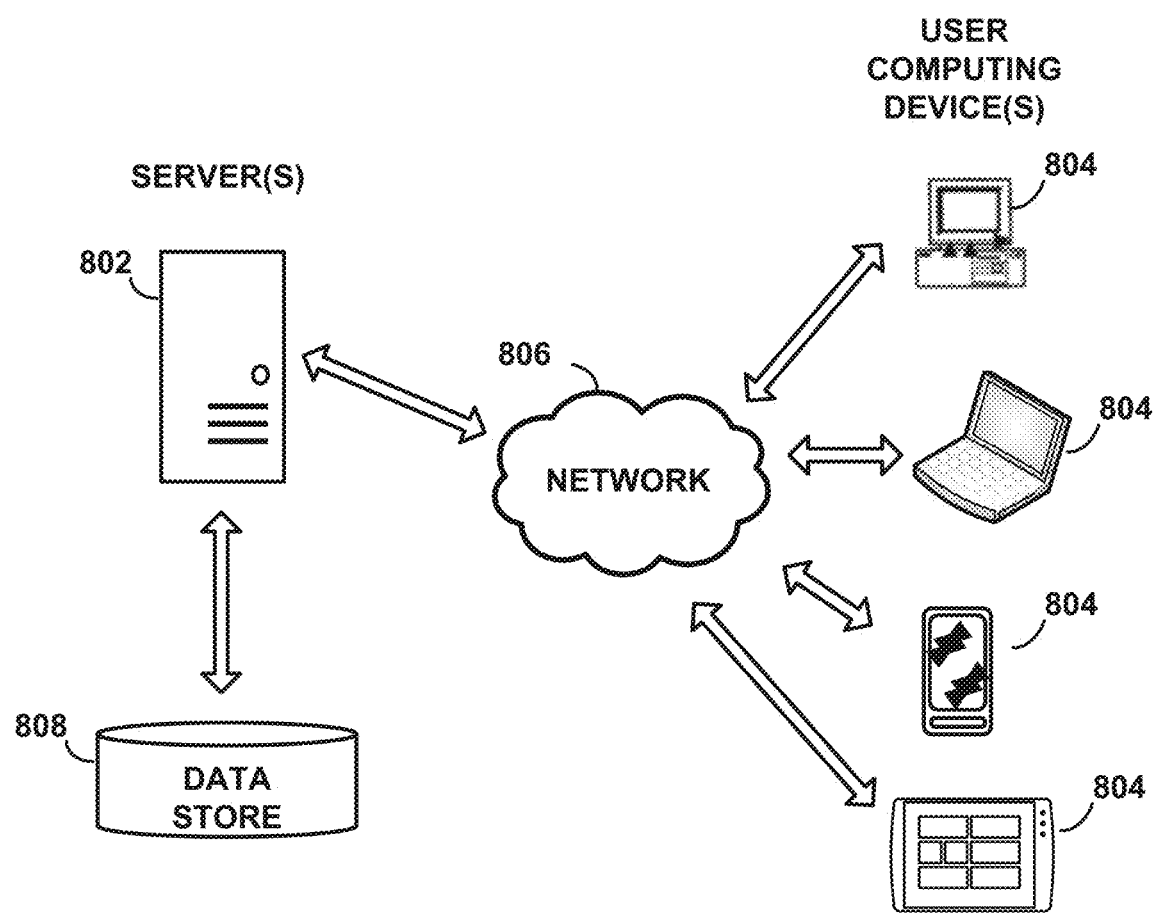

FIG. 8 illustrates some components that can be used in connection with one or more embodiments of the present disclosure.

Figure 9:
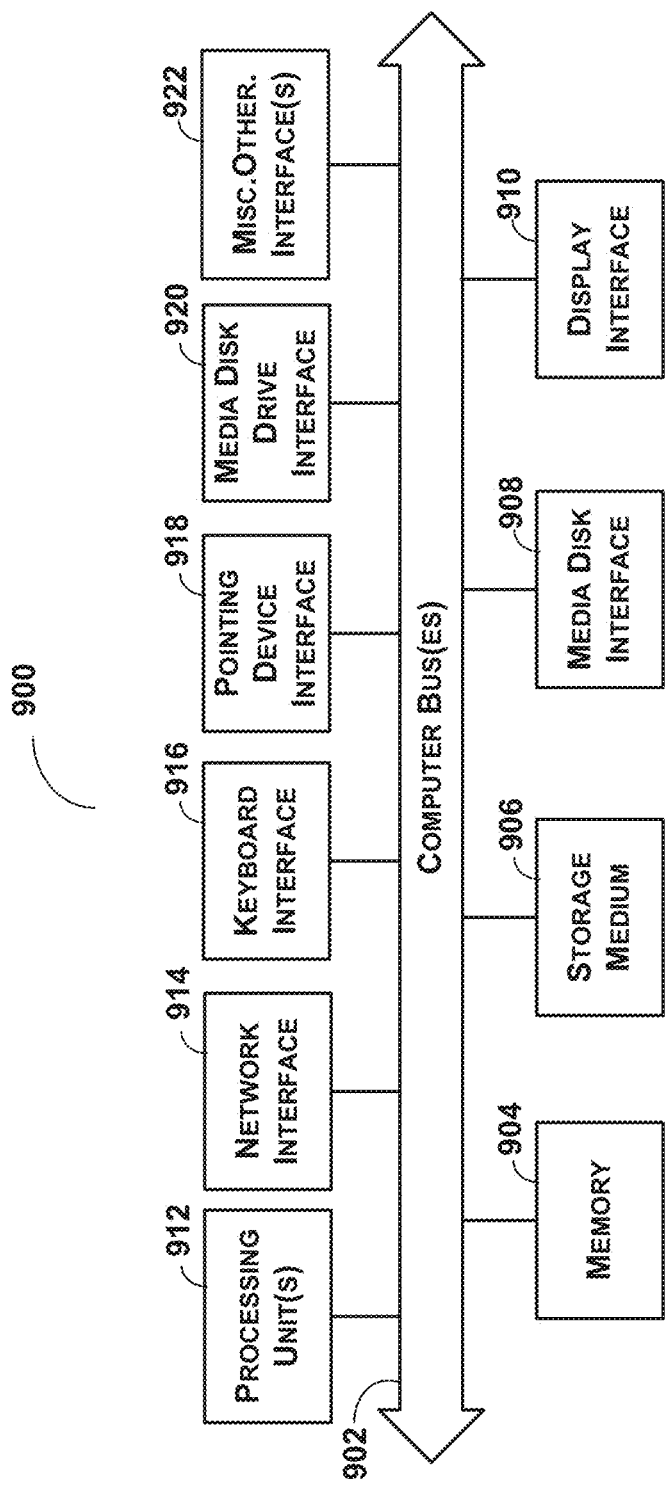

FIG. 9 is a detailed block diagram illustrating an internal architecture of a computing device in accordance with one or more embodiments of the present disclosure.

DETAILED DESCRIPTION

Subject matter will now he described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

in general, the present disclosure includes a visually-congruent, or visually-incongruent, digital content identification system, method and architecture. Embodiments of the present disclosure can be used to identify digital content in addition to content requested by a user. In accordance with at least one embodiment, the additional content is visually congruent, or incongruent, with content requested by a user, such that the additional content is similar, or dissimilar, to the requested content from a visual standpoint. By way of a non-limiting example, a visually congruent supplemental content item can match a visual style, or appearance, of one or more images included in a set of image search results requested by the user, and a visually incongruent content item can differ in visual style, or appearance, from one or more images included in a set of images search results. Given a requested content item, a number of visually congruent supplemental content items, and/or a number of visually incongruent supplement content items, may be identified for presentation with the requested content item.

Embodiments of the present disclosure identify a number of additional content items. At least one such embodiment further identifies a presentation position of each additional content item relative to a presentation position of each of a number of content items requested by the user. Embodiments of the present disclosure can be used in real-time in connection with an image search via the web, such as and without limitation a web-wide search or a website search, a personal photo search, etc. By way of some non-limiting examples, embodiments of the present disclosure may be used to search for images at a digital content hosting website such as Flickr®, a microblogging and social networking website such as Tumblr®, etc.

In accordance with one or more embodiments, one or more computer vision techniques can be used to automatically select the additional content from a corpus of digital content. Each content item in the corpus and each requested content item can be represented as a feature vector, with each feature vector representing visual features of a content item. By way of a non-limiting example, an image content item's feature vector represents the visual content of the image depicted by the content item.

Visual congruence of two content items can be determined to be a similarity between the feature vectors representing the two content items. With respect to a pair of content items, a nearest-neighbor similarity measure can be determined for the pair using each one's feature vector representation. Other mechanisms can be used in determining a measure of similarity using each content item's feature vector.

A similarity measure can be used to select a visually-congruent content item, or to select a visually-incongruent content item. A similarity measure determined between a supplemental content item and one or more primary content items can be used to determine whether to select the supplemental content item for presentation in a primary content item presentation including the one or more primary content items.

Visual image content, which is one type of content, is used in illustrative examples herein. Other types of content that may be used with embodiments of the present disclosure include multimedia content, video content, audio content, etc.

Figure 1:
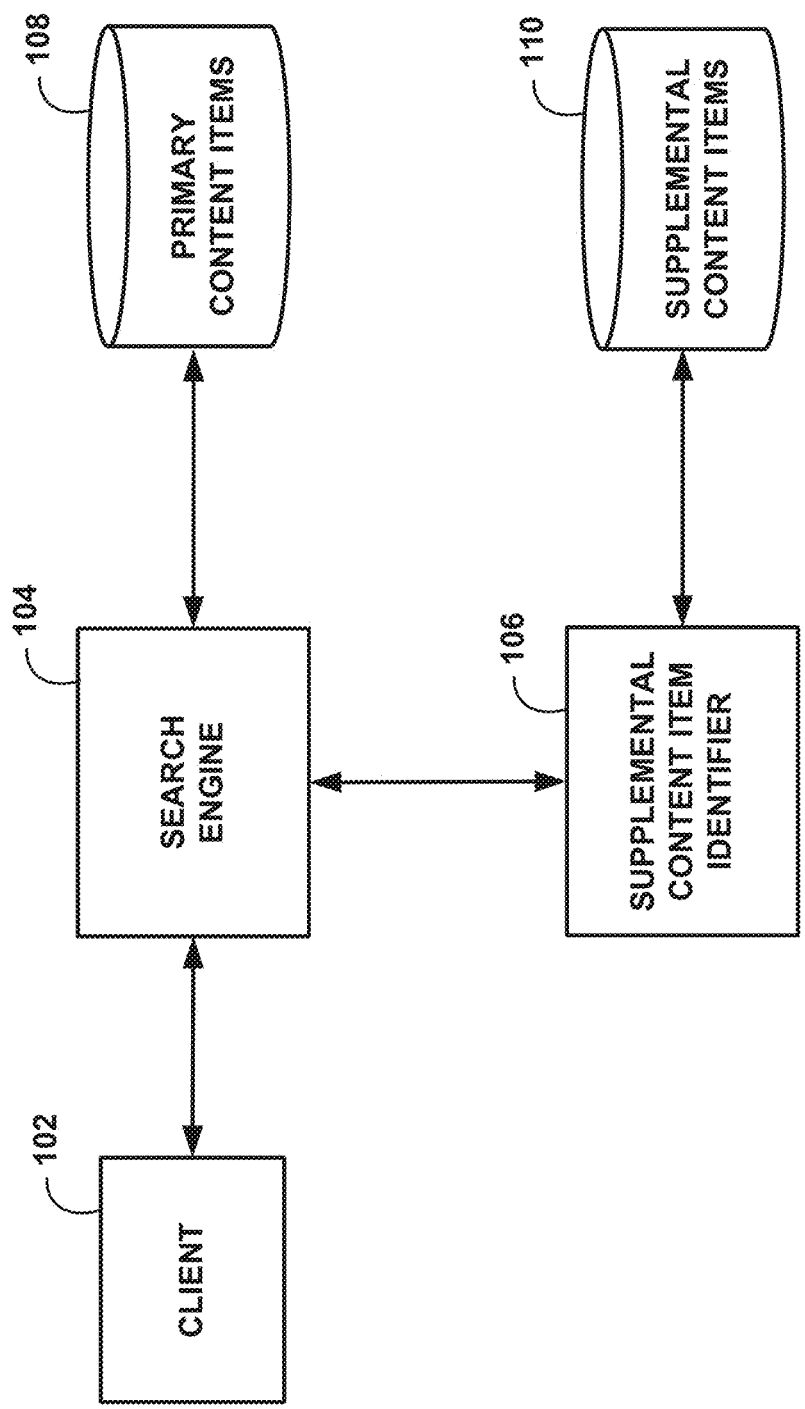

By way of one non-limiting example, the additional content comprises advertisement, or ad, content, and the corpus comprise a corpus of visual advertising content. In accordance with one or more embodiments, a visual advertisement can be selected and presented with other visual content, e.g., content requested by a user in a search request comprising search criterion, or criteria. The visual advertisement can be visually congruent, or visually similar, to one or more of the content items identified in the search. Alternatively, the visual advertisement can be visually incongruent, or visually dissimilar, to the one or more content items identified in the search. The identified visual advertisements can be placed near the one or more content items in a presentation of the one or more content items, e.g., in a web page or other user interface presentation, FIG. 1 provides an overview of components in an architecture in accordance with one or more embodiments of the present disclosure. FIG. 1 provides an example of a client server architecture. It should be apparent that other architectures are also possible, such as and without limitation a user computing device configured to provide functionality disclosed herein.

In the example provided in FIG. 1, a supplemental, or additional, content item is served to a client device with a number of primary content items in response to a request sent by client 102 and received by search engine 104. Search engine 104 can comprise one or more server computing devices in communication with client 102 and configured to provide the search engine 104. The client 102 can comprise a client computing device, which may be configured with software including application software such as and without limitation a web browser configured to send a content item request and to receive a response. The response may include a content item presentation comprising a number of primary content items and one or more supplemental content items visually similar (or visually dissimilar) to one or more of the primary content items. The client 102 can be configured to receive the response and to present, e.g., display on a display device at the client 102, the content item presentation.

In the example shown in FIG. 1, search engine 104 is configured to search a primary content item repository 108 using search criterion, or criteria, which may comprise one or more search terms of a search query received from client 102, one or more interests of the user, etc. Primary content items 108 may comprise content items, such as and without limitation images, available online.

Supplemental content item identifier 106 is configured to search for a number of supplemental content items 110 visually similar (or dissimilar) to the primary content item(s) identified by the search engine 104. Supplemental content items 110 can comprise content items, such as and without limitation images, other primary content items 108.

By way of a non-limiting example, supplemental content items 110 can be advertising content. Supplemental content items 110 can comprise advertising, or ad, content, which can be selected at least in part based on the visual similarity, or dissimilarity, of primary content items selected by search engine 104. In accordance with one or more embodiments, each supplemental content item that is an ad content item can be weighted based on advertiser preference or priority, which can be based on an amount of compensation the advertiser is willing to pay. By way of a non-limiting example, the advertiser may specify an amount that the advertiser is willing to pay for inclusion of the ad content in a presentation. A weight associated with a supplemental content item can be used by supplemental content item identifier 106 in selecting a number of supplemental content items.

By way of another non-limiting example, primary content items 108 can be images provided by a one or more users or content providers and supplemental content items 110 can be content items provided by one or more other users or content providers. As such, a user requesting the user's primary content items can be provided with content items other than the user's content items.

By way of a further non-limiting example, the other, supplemental, content items can be selected for the user based on similarity, or dissimilarity, to the requested primary items. The supplemental content item selection can be further based on relevance to the user's primary content item request, based on relevance to the user's primary content item selection criteria, the user's interest or interests associated with another user, or users, with similar, or dissimilar, interests, etc.

In the example of FIG. 1, while components 104 and 106 are shown as separate components, it should be apparent that any of the components can be combined. In addition and as with component 104, component 106 can comprise a number of computing devices configured to provide functionality, such as and without limitation functionality disclosed herein.

In accordance with one or more embodiments, client 102, search engine 104 and supplemental content item identifier 106 can be comprised in a single computing device, such as and without limitation a user computing device.

Figure 2:
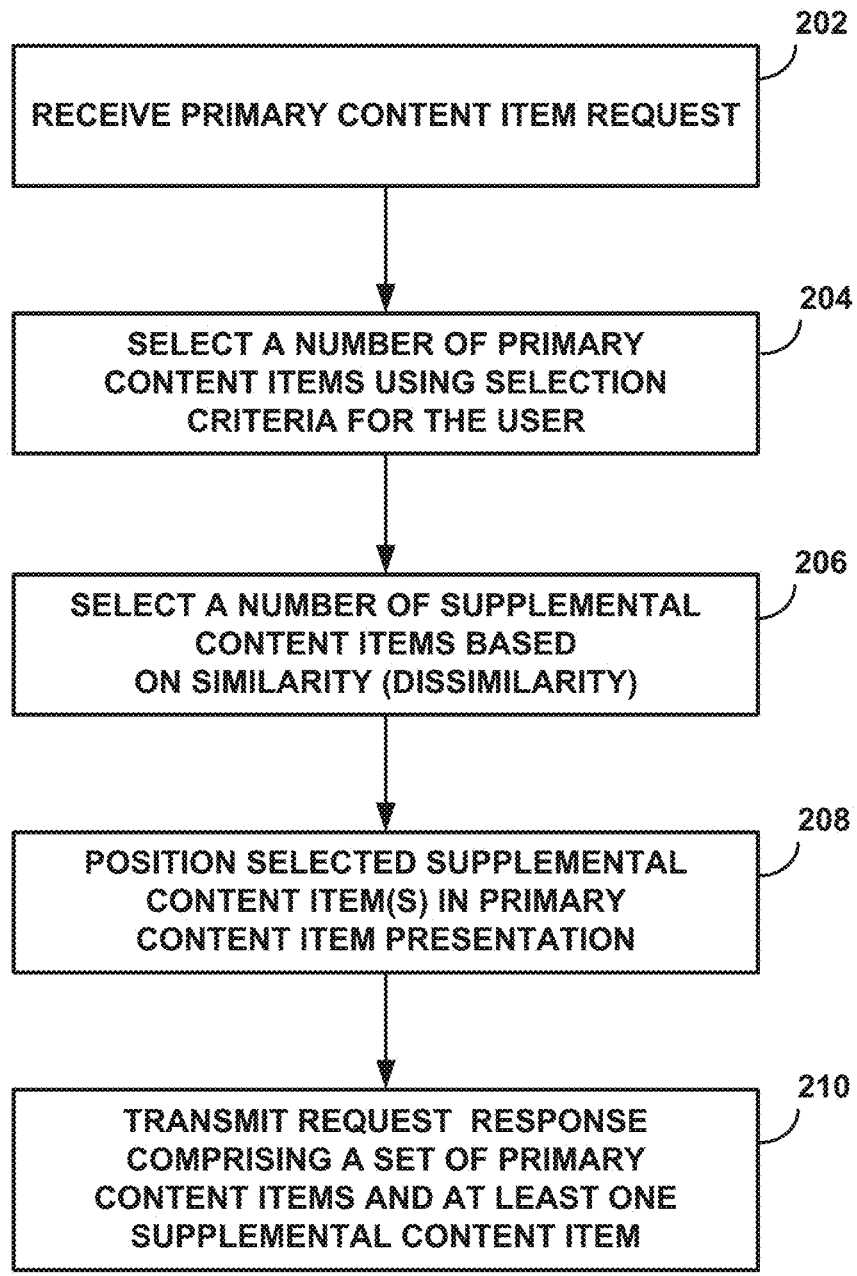

FIG. 2 provides an overview process flow in accordance with one or more embodiments of the present disclosure. At step 202, a primary content item request is received from a user computing device, such as and without limitation client 102 of FIG. 1. By way of a non-limiting example, the request can be received by search engine 104.

At step 204, at least one primary content item is selected using selection criteria associated with the request. By way of a non-limiting example, the selection criteria can be received with the request received at step 202. By way of a further non-limiting example, the selection criteria can comprise a number of search terms comprised in a search query, a number of user interests, a combination of search term(s) and user interest(s), etc.

At step 206, a number of supplemental content items are selected based on the visual appearance of at least one of the selected primary content items and the visual appearance of each candidate supplemental content item being considered for selection. Each supplemental content item selected from the set of candidates can be similar, or dissimilar, in its visual appearance to one or more of the primary content items in the set of selected primary content items.

At step 208, a position of each selected primary content item and each selected supplemental content item is determined in a content item presentation to be provided in response to the request received at step 202. The position of each selected primary content item can at least initially be based on a ranking, or ordering, determined in connection with the selection made at step 204. By way of a non-limiting example, the initial presentation position of each primary content item can be based on its relevance to selection criteria, which may be comprised in a search query and/or a number of user interests. The position of each selected supplemental content item can be based on its visual similarity, or dissimilarity, to one or more of the primary content items in the presentation. The initial position of a number of primary content items in the presentation can be modified. By way of a non-limiting example, a number of primary content items may be repositioned around a visually similar, or dissimilar, supplemental content item included in the presentation.

In accordance with one or more embodiments, each of the supplemental content items can be weighted based on its contextual relevance to the selection criteria used to select the primary content item(s) at step 204. By way of a non-limiting example, the weight associated with each supplemental content item can be used to select a set of candidate supplemental content items that are contextually relevant to the set of primary content items selected at step 204, and one or more supplemental content items can be selected from the candidates at step 206.

Other weights can be used in one or more embodiments. As discussed herein, a weight may be assigned to a supplemental content item that is an advertisement based on a preference or priority of the advertisement and/or advertiser.

At step 210, the content item presentation is provided, e.g., transmitted to a requesting client computing device, for presentation at a client computing device. By way of a non-limiting example, the content item presentation can be transmitted by search engine 104 to client computing device 102.

Figure 3:
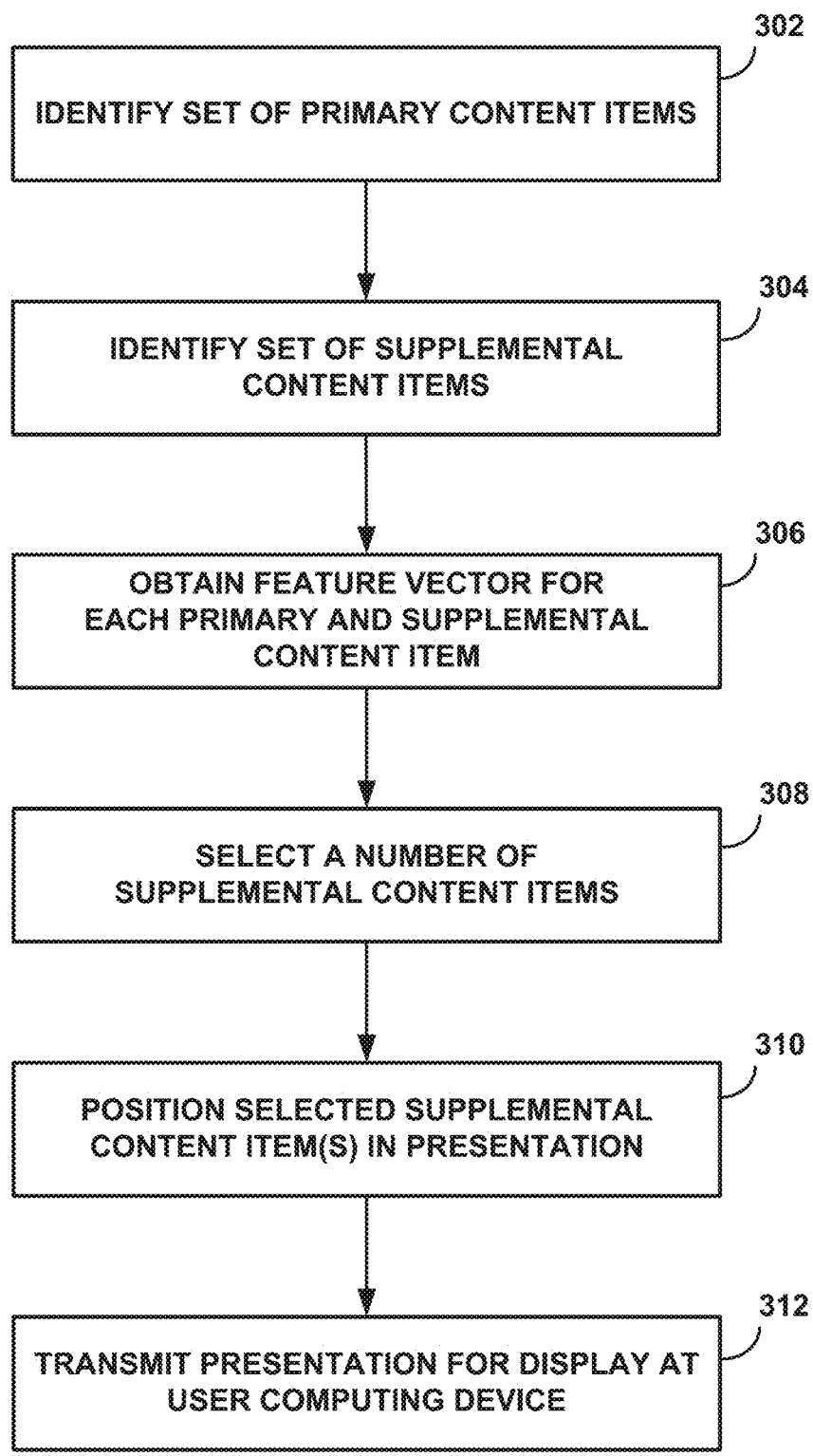

FIG. 3 provides a content item presentation process flow in accordance with one or more embodiments. At step 302, a set of primary content items is identified in response to a primary content item retrieval request. In accordance with one or more embodiments, the primary content items might be a set of content items returned as a set of search results from a query, e.g., a text query. By way of a non-limiting example, the set of primary content items, I, can comprise a number, n, primary content items. By way of a further non-limiting example, each primary content item in the set can be an image, with the set comprising n images returned as search results for a text query q by user u. In addition to a search query, the set of primary content items can be identified using other selection criteria, such as and without limitation one or more interests of the user.

At step 304, a set of candidate supplemental content items is identified. In accordance with one or more embodiments, the set of candidate supplemental content items can comprise a corpus of supplemental items. Alternatively, the set of candidate supplemental content items can be selected from the corpus of supplemental content items based on relevance, user interest, a combination of relevance and user interest, etc. In either case and as discussed in more detail below, a number of visually similar, and/or visually dissimilar, content items are selected for inclusion in the set of candidate supplemental content items.

In the at least one embodiment which optionally performs a pre-processing step to identify relevant candidate supplemental content items, e.g., relevant to a user's query, a user's interests or both, each supplemental content item that is selected for presentation with the primary content items is further selected based on its visual appearance, e.g., having a visual appearance that is either sufficiently similar or dissimilar to one or more of the primary content items. As an alternative and in accordance with at least one embodiment, each supplemental content item selected for presentation with the primary content items can be selected based on visual appearance without regard to relevance, user interest, etc.

A supplemental content item's relevance may be determined using a user's query, a user's interest, both the user's query and interests, etc. Relevance based on a query might be a semantic relevance, a topical relevance or a combination of semantic and topical relevance. By way of a non-limiting example, a query containing "convertible cars" as search criteria can be used as search criteria to search metadata, or other data, associated with the supplemental content items to identify a number of supplemental content items relevant to the query. Where supplemental content items are associated with topics, the query can be used to identify one or more topics, and the identified topic(s) can be used to identify a number of supplemental content items associated with the identified topic(s).

By way of a non-limiting example and in a case that the supplemental content items comprise advertisements, the "convertible cars" query can be used to identify a number of advertisement content items semantically and/or topically similar to the query, such as automobile advertisements for the query "convertible cars".

A supplemental content item's relevance may be based at least in part on the interests of the user. Al user's interests may be specified by the user, e.g., in a questionnaire or other input form, identified by observing the user's actions, browsing history, purchase history, etc. By way of a non-limiting example and using ad content items as an example, a car advertisement can be selected as relevant to the user's interest, where the user frequents car-related sites.

At step 306, visual features, which may be represented as a feature vector, are obtained for each primary and supplemental content item. Embodiments of the present disclosure use visual similarity, similarity based on image visual content, to select a number of supplemental content items. The selection can be made from a number of supplemental content items identified as being relevant, e.g., relevant to the user's query, the user's interests, etc. Alternatively, the selection can be made from a number of supplemental content items regardless of their relevance.

In accordance with one or more embodiments, visual similarity is determined using visual features. The features may be extracted from a content item using Deep Convolutional Neural Networks (CNNs), such as and without limitation the AlexNet deep CNN architecture. The AlexNet deep CNN provides a good trade-off between performance and speed. By way of a non-limiting example, the features comprise 4 k-dimensional features from the fully connected layer (fc) 7 of the CNN architecture, e.g., features extracted after the second fully connected layer. To obtain a more compact representation of a content item's features, the 4K-dimensional features can be reduced using dimensionality reduction, such as PCA, to reduce the representation to a 128-dimension representation of a content item.

Architectures other than the AlexNet deep CNN architecture may be used to determine a content item's features. The Inception architecture is another example of an architecture that may be used to extract a content item's features.

At step 308, a number of supplemental content items are selected. Embodiments of the present disclosure select at least one supplemental content item based on similarity, or dissimilarity. By way of some non-limiting examples, at least one supplemental content item can be selected that is the most visually similar, or least visually similar, to a number of presentation content items. The most (least) visual similar is relative to the other unselected supplemental content items. That is, supplemental content item that is selected may be the closest, or farthest, in visual appearance (relative to other unselected supplemental content items) to one or more of the primary content items.

A measure of similarity, or dissimilarity, of a supplemental content item to a primary content item can comprise a nearest neighbor Euclidean distance determined using a vector of the features of the supplemental content item and a vector of features of the primary content item.

In at least one embodiment, a selected supplemental content item might be the supplemental content item that is the closest, e.g., has the least distance, to one of the primary content items, which can be expressed as follows:

$$\tilde{a} = \arg\min_{a \in A_f} dist(a, I_f), \quad \text{Expression (1)}$$

where $A_f$ represents a set of feature vectors comprising a feature vector for each supplemental content item, $I_f$ represents a set of feature vectors comprising a feature vector for each primary content item, $\tilde{a}$ represents an optimal supplemental content item having a feature vector in the set $A_f$. The optimal supplemental content item can be the one that is the closest in distance (most similar), or the farthest (most dissimilar) to any one of the primary content items.

In the above expression, dist is a nearest neighbor function, Euclidean distance function, etc. For each supplemental content item, the dist function can be used to determine a measure, or degree, of similarity (dissimilarity), with respect to each primary content item. Each supplemental content item has a measure determined with respect to each primary content item, and the supplemental content item that has the greatest measure of similarity (dissimilarity) determined in connection with any of the primary content items can be selected.

As indicated in the above example of Expression (1) and with respect to the distance determined for other ones of the supplemental content items, the supplemental content item, $\tilde{a}$, closest to any of the primary content items is selected. In the above expression, the closest supplemental content item has the lowest distance measurement of any of the supplemental content items being considered.

With each supplemental content item having a distance measure associated with each primary content item, a supplemental content item that has the lowest (greatest) distance measurement from among the distance measurements determined for the supplemental content items being considered can be identified as a supplemental content item that is most similar (dissimilar) and is to be presented with the primary content items.

In the above example, the supplemental content item that is closest (farthest) in visual appearance to any one primary content item of the primary content items can be selected using a nearest neighbor search in the visual feature space. Alternatively, a supplemental content item that is closest (farthest) in visual appearance to the set of primary content items can be selected for presentation with the set of primary content items, which can be expressed as follows:

$$\tilde{a} = \arg\min_{a \in A_f} \sum_{i \in I_f} \|a - i\| \quad \text{Expression (2)}$$

In the above example, an aggregate distance is determined for each supplemental content item, where the aggregate distance is an aggregate of distances determined in the feature space between the supplemental content item and the primary content items. That is and as is shown in the above example expression, an absolute value of the difference between the supplemental content item's feature vector and a primary content item's feature vector is determined and added to a sum, or aggregate, distance determined for the supplemental content item in connection with the primary content items. The supplemental content item, $\tilde{a}$, with the least (or greatest for dissimilarity) aggregate distance can be selected as a supplemental content item that is most similar (or most dissimilar) and is to be presented with the set of primary content items.

In the above examples, one supplemental content item is selected. It should be apparent that more than one supplemental content item can be selected using either of the above expressions. By way of a non-limiting example, the supplemental content items can be sorted in ascending order, e.g., using each supplemental content item's lowest (greatest) distance determined using Expression (1) or using each supplemental content item's aggregate distance determined using Expression (2), and a number of the top-ranked content items can be selected. By way of a further non-limiting example, the sorting can be in descending order to select similar supplemental content items and in ascending order to select dissimilar supplemental content items.

At step 310, each selected supplemental content item is positioned in a presentation with the primary content item(s). Embodiments of the present disclosure present the primary content items for display as a two-dimensional grid. Other presentation approaches are also possible with embodiments of the present disclosure.

A presentation position of each supplemental content item selected for presentation can be determined based at least in part on the supplemental content item's visual appearance, e.g., its similarity or dissimilarity in visual appearance to one or more presentation content items.

In accordance with one or more embodiments, each selected supplemental content item can be positioned in the two-dimensional grid using the selected supplemental content item's similarity, or dissimilarity, to one or more of the primary content items. The initial ordering of the primary content items, which may be ordered initially based on relevance, degree of similarity to the user's interests, etc., may be changed. Thus, positioning of a selected supplemental content item for presentation with the primary content items can affect the ordering of the primary content items in the presentation. In a case where the original ordering of the primary content items is a priority, a positioning strategy that does not affect, or makes minimal changes to, the ordering can be used. In a case where ordering based on similarity (dissimilarity) is a priority, a positioning strategy minimizing the influence, or impact, of the initial ordering may be used. Different positioning strategies each affecting the ordering to a different degree are possible and can be used with embodiments of the present disclosure.

In embodiments, visual congruence (incongruence) in presenting the primary content items and the selected supplemental content item(s) can be maximized, by showing visually similar (dissimilar) supplemental content items and primary content items nearby on the grid. The primary content items in the set of primary content items can be ordered based on each primary content item's visual congruence (incongruence) to a selected supplemental content item. By way of a non-limiting example, a distance measurement, e.g., $\|i_i - \tilde{a}\|$, between a primary content item's feature vector, $i_i$ and the selected supplemental content item's feature vector, $\tilde{a}$, can be determined and used to sort the primary content items according to each one's distance measurement relative to the others.

In accordance with one or more embodiments, where preserving the original ordering of the primary content items is desired, the selected supplemental content item can be placed next to its most visually similar (dissimilar) primary content item. A determination of which side of the primary content item to place the selected supplemental content item can be determined based on the similarity (dissimilarity) of the neighboring images of the primary content item in the original ordering, such that the selected supplemental content item is placed on the side of the neighbor with the largest visual similarity (dissimilarity) to the selected supplemental content item.

By way of a non-limiting example, assuming that primary content item A is the most visually similar to the selected supplemental content item and primary content item B, which is on one side of primary content item A, is more visually similar to the selected supplemental content item then primary content item C, which is on the other side of primary content item A, then the selected supplemental content item can be placed between primary content item A and primary content item B.

Figure 4:
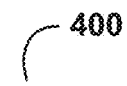

FIG. 4 shows an example of a positioning strategy for use in accordance with one or more embodiments of the present disclosure. In the examples illustrated in FIG. 4, as well as FIGS. 5 and 6, similarity is used to illustrate positioning strategies. It should be apparent that dissimilarity can also be used with the positioning strategies discussed in connection with FIGS. 4-6.

In the example shown in FIG. 4, a display grid 400 includes rows 1 through 5 and columns 1 through 7, each square labeled 402, 404, 408 and 410 is a primary content item, the selected supplemental content item is labeled 406 and the primary content item labeled 408 is the primary content item that are closest in visual appearance, or most visually similar, to the selected supplemental content item 406. In the example shown in FIG. 4, the primary images can be ordered, e.g., by relevance to a query, to a user's interests, etc used to identify the set of primary images. For example, the primary content item 402 in the top left position (row 1, column 1) in the two-dimensional grid might be the most relevant, with the primary content item 402 in the bottom right position (row 5, column 7) being the least relevant in such a case.

In the example shown in FIG. 4, the supplemental content item 406 is positioned between primary content item 408, which is closest in visual appearance to the supplemental content item 406, and primary content item 404, which is more visually similar to the supplemental content item 406 than primary content item 410. As further illustration using the example shown in FIG. 4, if primary content item 410 is more visually similar to supplemental content item 406 than primary content item 404, the supplemental content 406 could be placed between primary content items 408 and 410.

In the example shown in FIG. 4, the initial ordering of the primary content items remains the same with respect to each other, and the selected supplemental content item is inserted between primary content items without affecting the relative ordering of the primary content items.

Alternatively, a local ordering around a selected supplemental content item can be altered. In so doing, the selected supplemental content item can be placed between its two nearest neighbors from the set of primary content items, by changing the position of one of the two nearest neighbor primary content items. The ordering of the remaining primary content items remains intact.

Using FIG. 4 for purposes of illustration, assume that an original ordering of the primary content items had primary content item 404 followed by primary content item 410 in row 3. Primary content item 408 was initially positioned elsewhere in the grid, such as and without limitation somewhere in row 4 or 5. Assuming that the initial ordering of the primary content items was from top left to bottom right and was based on relevance, primary content item 408's initial position in row 4 or 5 indicates that it was less relevant than primary content items 404 and 410.

Further assuming that after primary content item 404, primary content item 408 is the most similar, of the primary content items other than primary content item 404, to supplemental content item, the ordering of the primary content item can be altered to place the selected supplemental content item 406 between its two nearest neighbor primary content items 404 and 408, by moving primary content item 408 up to row 3 and between the selected supplemental content item 406 and the primary content item 410.

The ordering of the primary content items before primary content item 404, e.g., the primary content items 402 in rows 1 and 2 and the primary content items 402 to the left of primary content item in row 3 remains the same. The primary content item 410 is shifted one position to the tight. In addition, the primary content items positioned after primary content item 410 and before the initial position of primary content item 408 shift to the right as well. For example and assuming that primary content item 408 is moved from row 4, column 5, primary content items 402 initially positioned in columns 1 through 4 of row 4 shift to the right one position and a primary content item 402 initially positioned in row 3, column 7 moves down to row 4, column 1 so that primary content item 410 can shift one position to the right (from column 6 to column 7) in row 3 to make room for primary content item 410.

In the above examples illustrated using FIG. 4, it is assumed that the primary content items are ordered in a one-dimensional stream. Other visually congruent positioning strategies can be achieved using a two-dimensional approach.

Figure 5:

In another positioning strategy used in accordance with one or more embodiments of the present disclosure, a neighborhood of each cell can be defined in a 4-way or 8-way connectivity. In so doing, a supplemental content item can be surrounded by its most similar primary content items in either 4 directions or 8 directions. FIG. 5 provides an example of a two dimensional approach in accordance with one or more embodiments of the present disclosure. In the example shown in FIG. 5, the supplemental content item 506 can be surrounded by visually-similar primary content items 504 in a 4-way connectivity, or by visually-similar primary content items 504 and 510 in an 8-way connectivity, in presentation grid 500.

In the 8-way connectivity example, primary content items 504 and 510 can be selected for placement around the supplemental content item 506 based on each one being determined to be the most visually similar to the supplemental content item 506, with primary content items 504 being more visually similar to the supplemental content item 506 than primary content items 510.

In another embodiment, a global reordering approach can be used so that primary content items and selected supplemental content items can be clustered based on visual similarity. In accordance with one or more such embodiments, a stochastic neighborhood embedding, such as and without limitation t-SNE, can be used to project the content items into a two-dimensional presentation. SNE can be used to reduce the dimensionality of high-dimension data, such as content item's 128-dimension feature vector, to smaller small number of dimensions, such as and without limitation two or three dimensions, while at the same time preserving distances in the original space, such as the content item feature space. Projecting the primary and supplemental content items into a two-dimensional, or three-dimensional space, each content item's coordinates may be used to map the content item to a presentation space in accordance with visual similarity (dissimilarity).

Figures 6A, 6B:
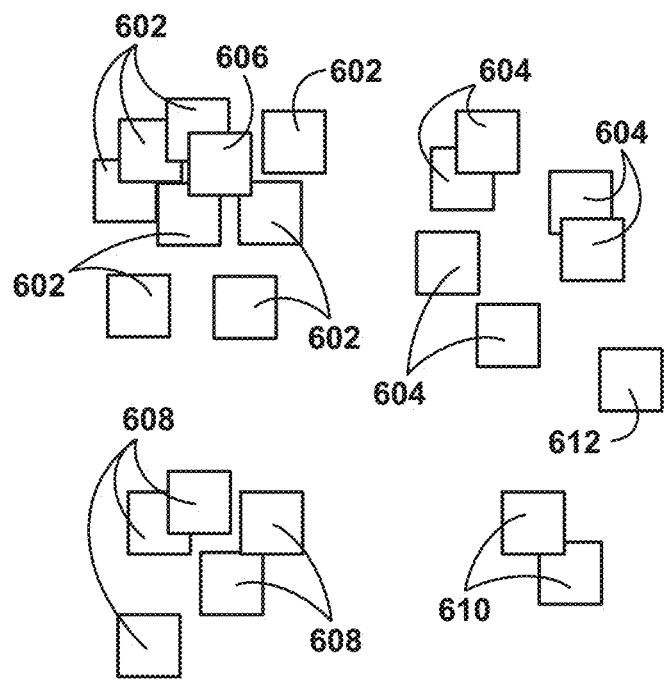
FIG. 6A illustrates a density-based clustering in two-dimensional space in accordance with one or more embodiments of the present disclosure.
FIG. 6B illustrates the image clusters of FIG. 6A on a two-dimensional presentation grid in accordance with one or more embodiments of the present disclosure.

In at least one embodiment, a projection such as that provided by SNE, projects each of the primary and supplemental content items into a small-dimension space. A clustering algorithm, such as the density-based fast Mean Shift clustering, can be used to create content item clusters. FIG. 6A illustrates a density-based clustering in a two-dimensional space in accordance with one or more embodiments of the present disclosure. Different reference numbers represent different clusters. That is, 602, 604, 608, 610 and 612 represent different content item clusters. Each of the primary content items 602 clustered together are more similar to each other than to any of the other primary content items in other clusters. Similarly, the primary content items 604 clustered together are more similar to each other than to any of the other primary content items in other clusters, and so on.

Supplemental content item 606 is identified as being in the same cluster as the primary content items 602, which indicates that supplemental content item is more similar to the cluster of primary content items 602 than the primary content items in other clusters.

With respect to a given one of the primary content items 602 in the cluster, its spacing relative to another primary content item 602 in the cluster indicates the visual similarity between the two primary content items. In the example shown in FIG. 6A., the position of the supplemental content item 606 indicates the primary content items 602 to which the supplemental content item is most visually similar. As with the cluster of primary content items 602, spacing in other clusters is indicative of visual similarity. In addition, spacing between clusters is indicative of a visual similarity between content item clusters; and spacing of one content time relative to another content item in the two-dimensional space is indicative of the visual similarity of the two content items, such that the farther away the content items are, the less similar they are, and vice versa.

FIG. 6B illustrates the image clusters of FIG. 6A on a two-dimensional presentation grid in accordance with one or more embodiments of the present disclosure. Each content item has a set of coordinates, e.g., x and y coordinates in the two-dimensional space shown in FIG. 6A. A content item's coordinates can be used to determine its position in the presentation grid 600 shown in FIG. 6B, An approach for placing the primary and supplemental content items in the presentation grid 600 using the two-dimensional space coordinates identified during the projection comprises greedily selecting the closest grid position in two-dimensional space for each content item. In other words, each content item's two-dimensional coordinates are used to identify the closest grid position in the presentation grid, and the content item is placed at the identified position if it is not already occupied by another content item. Priority can be given to the supplemental content item to ensure its positioning among visually similar primary content items, and content items can be considered in ascending visual similarity from the supplemental content item, The greedy approach may result in visually similar content items being placed far apart on the grid. In order to avoid this, content items belonging to a cluster identified using a density-based clustering such as the fast Mean Shift clustering can be positioned, e.g., greedily placed, in adjacent positions of the presentation grid 600. In other words, content items that correspond to the same cluster can be greedily placed in adjacent positions of the presentation grid 600.

In the example shown in FIG. 6B, each content item is assigned to a position of the presentation grid 600. Primary content items having the same reference number in the presentation grid 600 belong to the same cluster. The supplemental content item 606 is placed among primary content items 602, which belong to the same cluster, thus ensuring visual coherency.

The projection and clustering can be used to determine a degree to which the supplemental content item 606 is visually close to one or more of the primary content items. It is possible that the supplemental content item 606 is not consistent enough visually with at least some of the primary content items. For example, the supplemental content item 606 may be placed in a cluster by itself. This is an indication that the supplemental content item 606 is not visually similar, or visually congruent, with at least some of the primary content items. In such a case and if visual congruence (rather than visual incongruence) is desired, the supplemental content item 606 may be discarded and not included in the presentation grid. In this way, the projection and clustering may be used, in place of a parameter or fixed threshold, for determining a degree of visual congruence between the supplemental content item 606 and one or more of the primary content items.

A window, e.g., a browser or other user interface window, in which a presentation grid, such as presentation grid 400, 500 or 600, is displayed may be resized. The presentation grid may be static such that it is does not change in response to the window being resized. Alternatively, the presentation grid may be dynamically determined in response to resizing the window. If the image grid is dynamic and responsive to change, such as a window being resized, the orderings may be re-computed on the fly in response.

Referring again to FIG. 3, the presentation, which may comprise a presentation grid such as and without limitation presentation grid 400, 500 or 600, is transmitted to a user computing device, which may be a device from which a content item request is received.

FIG. 7, which comprises FIGS. 7A, 7B and 7C, provides an example of a flow which uses projection and clustering for content item positioning in accordance with one or more embodiments of the present disclosure.

In the example shown in FIG. 7A, a text query 702 is used to retrieve a set of candidate supplemental content items 704 and a set of primary content item search results 706. The supplemental content item marked with an X is the candidate supplemental content item determined to be most similar (or dissimilar) to the primary content item search results 704. As discussed herein, in accordance with at least one embodiment, the selected supplemental content item is selected based on the visual appearance of the supplemental content item and visual appearance of a number of the primary content item, where each content item's visual appearance is represented using a vector of features.

The letter designation for each primary content item in the primary content items 706 indicates a cluster, or group, of similar primary content items. For example, the primary content items designated with a B are visually similar, such that they are more visually similar with each other than with others of the primary content items. The B designation corresponds to a content item cluster, or group. The feature vector associated with each primary content item can he used to identify the cluster to which the primary content item belongs.

With reference to FIG. 7B, the multi-dimensional feature vectors representing the supplemental and primary content items are projected onto a two-dimensional space 708, and clusters are formed. The projection and clustering is performed using the multi-dimensional feature vector of each content item. By way of non-limiting examples, the projection and clustering can he performed using SNE and fast Mean Shift clustering. Each box represents a content item in the two-dimensional space. Content items with like reference numbers belong to the same cluster. For purposes of illustration and with reference to FIG. 7A, each content item 602 corresponds to a content item designated with a B, each content item 604 corresponds to a content item designated with a P, each content item 608 corresponds to a content item designated with a G, each content item 610 corresponds to a content item designated with a O, and each content item 612 corresponds to a content item designated with a Y.

Each of content items 606 and 614 corresponds to a candidate supplemental content item 704. Content item 606 corresponds to the candidate supplemental content item marked with the X in FIG. 7A. With respect to content items 606 and 614, content item 606 is the most similar to the primary content items than supplemental content items 614. Similarity may be determined using expression (1) or expression (2).

Each content item has a set of coordinates representing the content item's position in the two-dimensional space, which can be used to position the content item in the presentation grid 660, as is discussed in more detail in connection with FIG. 6.

FIG. 8 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 802 can be configured to execute program code, instructions, etc. to provide functionality in accordance with one or more embodiments of the present disclosure. The same or another computing device 802 may be configured to execute program code to implement functionality in accordance with one or more embodiments of the present disclosure.

Computing device 802 can serve content to user computing devices 804 using a browser application via a network 806. Data store 808 can be used to store program code to configure a server 802 to functionality in accordance with one or more embodiments of the present disclosure.

The user computing device 804, and/or user device 102, can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 802 and the user computing device 804 can include one or more processors, memory, a removable media reader, network interface, display and interface, and one or more input devices, e.g., keyboard, keypad, mouse, etc. and input device interface, for example. One skilled in the art will recognize that server 802 and user computing device 804 may be configured in many different ways and implemented using many different combinations of hardware, software, or firmware.

In accordance with one or more embodiments, a computing device 802 can make a user interface available to a user computing device 804 via the network 806. The user interface made available to the user computing device 804 can include content items, or identifiers (e.g., URLs) selected for the user interface in accordance with one or more embodiments of the present invention. In accordance with one or more embodiments, computing device 802 makes a user interface available to a user computing device 804 by communicating a definition of the user interface to the user computing device 804 via the network 806. The user interface definition can be specified using any of a number of languages, including without limitation a markup language such as Hypertext Markup Language, scripts, applets and the like. The user interface definition can be processed by an application executing on the user computing device 804, such as a browser application, to output the user interface on a display coupled, e.g., a display directly or indirectly connected, to the user computing device 804.

In an embodiment the network 806 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suite as the Internet. Two of the most important elements in the suite are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, fur example, be routed via a path of gateways, servers, etc. that may route the signal packet in accordance with a target address and availability of a network path to the target address.

It should be apparent that embodiments of the present disclosure can be implemented in a client-server environment such as that shown in FIG. 8. Alternatively, embodiments of the present disclosure can be implemented with other environments. As one non-limiting example, a. peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

FIG. 9 is a detailed block diagram illustrating an internal architecture of a computing device, e.g., a computing device such as server 802 or user computing device 804, in accordance with one or more embodiments of the present disclosure. As shown in FIG. 9, internal architecture 900 includes one or more processing units, processors, or processing cores, (also referred to herein as CPUs) 912, which interface with at least one computer bus 902. Also interfacing with computer bus 902 are computer-readable medium, or media, 906, network interface 914, memory 904, e.g., random access memory (RAM), run-time transient memory, read only memory (ROM), etc., media disk drive interface 920 as an interface for a drive that can read and/or write to media including removable media such as floppy, CD-ROM, DVD, etc. media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code, and/or computer-executable process steps, incorporating functionality described herein, e.g., one or more of process flows described herein. CPU 912 first loads computer-executable process steps from storage, e.g., memory 904, computer-readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   receiving, by a server computing device from a client computing device, a request for a set of primary content items;
   selecting, by the server computing device, a number of primary content items using selection criteria associated with the request;
   obtaining, by the server computing device and for each primary content item of the number, a feature vector representing a visual appearance of the primary content item;
   obtaining, by the server computing device and for each supplemental content item of a number of supplemental content items, the feature vector representing the visual appearance of the supplemental content item;
   selecting, by the server computing device and using a number of the obtained feature vectors, a supplemental content item from the number of supplemental content items based on its visual appearance relative to at least one primary content item of the number of primary content items, the selecting comprising using a distance measure determined using the feature vector of the selected supplemental content item and the feature vector of each primary content item of the at least one primary content item, the distance measure indicating a degree of similarity of the selected supplemental content item's visual appearance to that of the at least one primary content item;
   positioning, by the server computing device, the selected supplemental content item among the number of primary content items in a presentation response, the selected supplemental content item being positioned adjacent to the at least one primary content item in the presentation response in accordance with the degree of similarity of the selected supplemental content item's visual appearance to that of the at least one primary content item; and
   transmitting, by the server computing device, the presentation response in response to the primary content item request.

2. The method of claim 1, the selection criteria comprising a number of search terms of a search query received with the request.

3. The method of claim 2, selecting the supplemental content item further comprising:
   selecting the supplemental content item based on the distance measure and on a contextual relevance of the supplemental content item to the search query.

4. The method of claim 1, selecting the supplemental content item further comprising:

selecting the supplemental content item based on the distance measure and an interest of a user of the client computing device.

5. The method of claim 1, the positioning further comprising:
positioning each primary content item of the number in a two-dimensional grid of the presentation response based on the primary content item's respective relevance to the selection criteria; and
inserting the selected supplemental content item in the presentation response's two-dimensional grid, so that the selected supplemental content item is adjacent to the at least one primary content item in the presentation response's two-dimensional grid.

6. The method of claim 5, the inserting further comprising:
inserting the selected supplemental content item at a position in the two-dimensional grid adjacent to a selected first primary content item, of the at least one primary content item, that is most visually congruent to the supplemental content item relative to other primary content items of the number of primary content items.

7. The method of claim 6, the inserting further comprising:
selecting, from the other primary content items, at least one additional primary content item other than the first primary content item, each selected additional primary content item being more visually congruent to the selected supplemental content item than any unselected primary content item of the number of primary content items; and
for each selected additional primary content item that is not adjacent to the selected supplemental content item in the presentation response's two-dimensional grid, repositioning the selected additional primary content item to a selected position in the presentation grid adjacent to the selected supplemental content item, the selected position is other than the first primary content item's position and is other than a position of another selected additional primary content item.

8. The method of claim 7, selecting at least one additional primary content item comprising selecting one of three additional primary content items and selecting one of seven additional primary content items.

9. The method of claim 5, the inserting further comprising:
inserting the selected supplemental content item at a position in the two-dimensional grid adjacent to a selected first primary content item, of the at least one primary content item, that is most visually incongruent to the supplemental content item relative to other primary content items of the number of primary content items.

10. The method of claim 9, the inserting further comprising:
selecting, from the other primary content items, at least one additional primary content item other than the first primary content item, each selected additional primary content item being more visually incongruent to the selected supplemental content item than any unselected primary content item of the number of primary content items; and
for each selected additional primary content item that is not adjacent to the selected supplemental content item in the presentation response's two-dimensional grid, repositioning the selected additional primary content item to a selected position in the presentation grid adjacent to the selected supplemental content item, the selected position is other than the first primary content item's position and is other than a position of another selected additional primary content item.

11. The method of claim 10, selecting at least one additional primary content item comprising selecting one of three additional primary content items and selecting one of seven additional primary content items.

12. The method of claim 1, the positioning further comprising:
projecting each content item of a number of content items into a two-dimensional feature space using the content item's visual features, the number of content items comprising the number of primary content items and a number of supplemental content items including the selected supplemental content item, the projecting comprising identifying coordinates in the two-dimensional space for each content item of the number of content items;
identifying a number of clusters, each cluster comprising at least one of the number of content items, the supplemental content item being assigned to a cluster of the number of clusters; and
positioning each primary content item of the number of primary content items and the selected supplemental content item according to the identified clusters and the coordinates associated with each primary content item of the number of primary content items and the selected supplemental content item.

13. A non-transitory computer-readable storage medium tangibly encoded with computer-executable instructions, that when executed by a processor associated with a computing device, performs a method comprising:
receiving, from a client computing device, a request for a set of primary content items;
selecting a number of primary content items using selection criteria associated with the request;
obtaining, for each primary content item of the number, a feature vector representing a visual appearance of the primary content item;
obtaining, for each supplemental content item of a number of supplemental content items, the feature vector representing the visual appearance of the supplemental content item;
selecting, using a number of the obtained feature vectors, a supplemental content item from the number of supplemental content items based on its visual appearance relative to at least one primary content item of the number of primary content items, the selecting comprising using a visual appearance distance measure determined using the feature vector of the selected supplemental content item and the feature vector of each primary content item of the at least one primary content item, the visual appearance distance measure indicating a degree of similarity of the selected supplemental content item's visual appearance to that of the at least one primary content item;
positioning the selected supplemental content item among the number of primary content items in a presentation response, the selected supplemental content item being positioned adjacent to the at least one primary content item in the presentation response in accordance with the degree of similarity of the selected supplemental content item's visual appearance to that of the at least one primary content item; and
transmitting the presentation response in response to the primary content item request.

14. The non-transitory computer-readable storage medium of claim 13, the selection criteria comprising a number of search terms of a search query received with the request.

15. The non-transitory computer-readable storage medium of claim 14, the supplemental content item selection further comprising:
selecting the supplemental content item based on the distance measure and on a contextual relevance of the supplemental content item to the search query.

16. The non-transitory computer-readable storage medium of claim 13, the supplemental content item selection further comprising:
selecting the supplemental content item based on the distance measure and an interest of a user of the client computing device.

17. The non-transitory computer-readable storage medium of claim 13, the primary content item and supplemental content item positioning further comprising:
positioning each primary content item of the number in a two-dimensional grid of the presentation response based on the primary content item's respective relevance to the selection criteria; and
inserting the selected supplemental content item in the presentation response's two-dimensional grid, so that the selected supplemental content item is adjacent to the at least one primary content item in the presentation response's two-dimensional grid.

18. The non-transitory computer-readable storage medium of claim 17, the selected supplemental content item insertion further comprising:
inserting the selected supplemental content item at a position in the two-dimensional grid adjacent to a selected first primary content item, of the at least one primary content item, that is most visually congruent to the supplemental content item relative to other primary content items of the number of primary content items.

19. The non-transitory computer-readable storage medium of claim 18, the selected supplemental content item insertion further comprising:
selecting, from the other primary content items, at least one additional primary content item other than the first primary content item, each selected additional primary content item being more visually congruent to the selected supplemental content item than any unselected primary content item of the number of primary content items; and
for each selected additional primary content item that is not adjacent to the selected supplemental content item in the presentation response's two-dimensional grid, repositioning the selected additional primary content item to a selected position in the presentation grid adjacent to the selected supplemental content item, the selected position is other than the first primary content item's position and is other than a position of another selected additional primary content item.

20. The non-transitory computer-readable storage medium of claim 19, the at least one additional primary content item selection comprising selecting one of three additional primary content items and selecting one of seven additional primary content items.

21. The non-transitory computer-readable storage medium of claim 17, the selected supplemental content item insertion further comprising:
inserting the selected supplemental content item at a position in the two-dimensional grid adjacent to a selected first primary content item, of the at least one primary content item, that is most visually incongruent to the supplemental content item relative to other primary content items of the number of primary content items.

22. The non-transitory computer-readable storage medium of claim 21, the selected supplemental content item insertion further comprising:
selecting, from the other primary content items, at least one additional primary content item other than the first primary content item, each selected additional primary content item being more visually incongruent to the selected supplemental content item than any unselected primary content item of the number of primary content items; and
for each selected additional primary content item that is not adjacent to the selected supplemental content item in the presentation response's two-dimensional grid, repositioning the selected additional primary content item to a selected position in the presentation grid adjacent to the selected supplemental content item, the selected position is other than the first primary content item's position and is other than a position of another selected additional primary content item.

23. The non-transitory computer-readable storage medium of claim 22, the at least one additional primary content item selection comprising selecting one of three additional primary content items and selecting one of seven additional primary content items.

24. The non-transitory computer-readable storage medium of claim 13, the number of primary content items and the selected supplemental content item positioning further comprising:
projecting each content item of a number of content items into a two-dimensional feature space using the content item's visual features, the number of content items comprising the number of primary content items and a number of supplemental content items including the selected supplemental content item, the projecting comprising identifying coordinates in the two-dimensional space for each content item of the number of content items;
identifying a number of clusters, each cluster comprising at least one of the number of content items, the supplemental content item being assigned to a cluster of the number of clusters; and
positioning each primary content item of the number of primary content items and the selected supplemental content item according to the identified clusters and the coordinates associated with each primary content item of the number of primary content items and the selected supplemental content item.

25. A system comprising:
a server computing device comprising a processor and a storage medium for tangibly storing thereon program logic for execution by the processor, the stored program logic comprising:
receiving logic executed by the processor for receiving, from a client computing device, a request for a set of primary content items;
selecting logic executed by the processor for selecting a number of primary content items using selection criteria associated with the request;
obtaining logic executed by the processor for obtaining, for each primary content item of the number, a feature vector representing a visual appearance of the primary content item;

obtaining logic executed by the processor for obtaining, for each supplemental content item of a number of supplemental content items, the feature vector representing the visual appearance of the supplemental content item;

selecting logic executed by the processor for selecting, using a number of the obtained feature vectors, a supplemental content item from the number of supplemental content items based on its visual appearance relative to at least one primary content item of the number of primary content items, the selecting comprising using a distance measure determined using the feature vector of the selected supplemental content item and the feature vector of each primary content item of the at least one primary content item, the distance measure indicating a degree of similarity of the selected supplemental content item's visual appearance to that of the at least one primary content item;

positioning logic executed by the processor for positioning the selected supplemental content item among the number of primary content items in a presentation response, the selected supplemental content item being positioned adjacent to the at least one primary content item in the presentation response in accordance with the degree of similarity of the selected supplemental content item's visual appearance to that of the at least one primary content item; and transmitting logic executed by the processor for transmitting the presentation response in response to the primary content item request.

26. The method of claim 1, the selected supplemental content item is positioned adjacent to the at least one primary content item in the presentation response in accordance with the distance measure determined for the selected supplemental content item.

* * * * *